United States Patent
Harada (10) Patent No.: US 8,928,843 B2
(45) Date of Patent: Jan. 6, 2015

(54) LIQUID CRYSTAL DISPLAY MODULE COMPRISING A TRANSPARENT MEDIA LAYER INTERPOSED BETWEEN A REFLECTION POLARIZING PLATE AND AN OPTICAL SHEET

(75) Inventor: Kenichi Harada, Wakayama (JP)

(73) Assignee: Keiwa Inc., Osaka (JP)

( * ) Notice: Subject to any disclaimer, the term of this patent is extended or adjusted under 35 U.S.C. 154(b) by 885 days.

(21) Appl. No.: 11/821,725

(22) Filed: Jun. 25, 2007

(65) Prior Publication Data

US 2008/0123028 A1    May 29, 2008

(30) Foreign Application Priority Data

Jun. 26, 2006    (JP) .................. 2006-175809

(51) Int. Cl.
*G02F 1/1335* (2006.01)
*F21V 8/00* (2006.01)

(52) U.S. Cl.
CPC .......... *G02B 6/0056* (2013.01); *G02F 1/13362* (2013.01); *G02F 1/133536* (2013.01); *G02F 2202/40* (2013.01)
USPC ......................................... 349/115; 349/117

(58) Field of Classification Search
USPC ....................................................... 349/115
See application file for complete search history.

(56) References Cited

U.S. PATENT DOCUMENTS

| | | |
|---|---|---|
| 5,422,756 A | 6/1995 | Weber |
| 5,587,816 A | 12/1996 | Gunjima et al. |
| 5,712,694 A | 1/1998 | Taira et al. |
| 5,828,471 A | 10/1998 | Davis et al. |
| 6,088,067 A | 7/2000 | Willett et al. |

(Continued)

FOREIGN PATENT DOCUMENTS

| | | |
|---|---|---|
| CN | 1191610 | 8/1990 |
| CN | 1372148 | 10/2002 |

(Continued)

OTHER PUBLICATIONS

Liwei Lin et al., Silicon-processed plastic micropyramids for brightness enhancement applications, 2000, J. Micromech. Microeng. 10, pp. 395-400.*

(Continued)

*Primary Examiner* — Paul Lee
(74) *Attorney, Agent, or Firm* — Jordan and Hamburg LLP (57) ABSTRACT

An object of the present invention is to provide an optical unit and a backlight unit which can markedly enhance utilization efficiency of rays of light and dramatically increase luminance, and which are suited for immediate beneath type liquid crystal display modules and the like. The optical unit of the present invention is a rectangular layered structural member having a reflection polarizing plate, an optical sheet superposed on the back face side of the reflection polarizing plate, and a transparent media layer filled between the reflection polarizing plate and the optical sheet. This optical sheet includes a resin substrate film having an optical anisotropy, and the absolute value of the angle of the crystal orientation of the substrate film with respect to the transmission axial orientation of the reflection polarizing plate is $\pi/8$ or greater and $3\pi/8$ or less. The retardation value of the substrate film is preferably 70 nm or greater and 320 nm or less. The optical sheet preferably has an optical layer laminated on one face of the substrate film. The liquid crystal display module of the present invention has a liquid crystal display element, the optical unit, and an immediate beneath type backlight.

1 Claim, 5 Drawing Sheets

(56) References Cited

U.S. PATENT DOCUMENTS

| | | | |
|---|---|---|---|
| 6,709,143 | B2 | 3/2004 | Harada et al. |
| 7,006,173 | B1* | 2/2006 | Hiyama et al. ............... 349/96 |
| 7,158,297 | B2* | 1/2007 | Umeya ...................... 359/443 |
| 7,190,354 | B2* | 3/2007 | Tanaka et al. ............... 345/173 |
| 2004/0047163 | A1* | 3/2004 | Harada et al. ............... 362/558 |
| 2005/0063062 | A1 | 3/2005 | Ito et al. |
| 2006/0118797 | A1* | 6/2006 | Masuyama et al. ........... 257/88 |
| 2006/0209220 | A1* | 9/2006 | Hara et al. ................... 349/5 |
| 2006/0210709 | A1* | 9/2006 | Shutou ....................... 427/163.1 |
| 2007/0076432 | A1 | 4/2007 | Yang et al. |

FOREIGN PATENT DOCUMENTS

| | | |
|---|---|---|
| EP | 0 720 040 | 7/1996 |
| JP | 6-230229 | 8/1994 |
| JP | 9-506985 | 7/1997 |
| JP | 9-329712 | 12/1997 |
| JP | 11-295731 | 10/1999 |
| JP | 11-295735 | 10/1999 |
| JP | 2000-089007 | 3/2000 |
| JP | 2004-004970 | 1/2004 |
| JP | 2004-037988 | 2/2004 |
| JP | 2004-319171 | 11/2004 |
| JP | 2004-341294 | 12/2004 |
| JP | 2005-044642 | 2/2005 |
| JP | 2005-049857 | 2/2005 |
| JP | 2005-091825 | 4/2005 |
| JP | 2005-106959 | 4/2005 |
| JP | 2005-266323 | 9/2005 |
| KR | 10200400515 | 6/2004 |
| WO | WO-95/17692 | 6/1995 |
| WO | WO-97/01780 | 1/1997 |

OTHER PUBLICATIONS (Liwei Lin et al 2000, Silicon-processed plastic micropyramids for brightness enhancement applications, J. Micromech. Microeng. 10 395, doi: 10.1088/0960-1317/10/3/314).*

* cited by examiner

Prior Art

LIQUID CRYSTAL DISPLAY MODULE COMPRISING A TRANSPARENT MEDIA LAYER INTERPOSED BETWEEN A REFLECTION POLARIZING PLATE AND AN OPTICAL SHEET

BACKGROUND OF THE INVENTION

1. Field of Invention

The present invention relates to optical units capable of markedly enhancing utilization efficiency of rays of light and improving luminance, and liquid crystal display modules using the same.

2. Description of the Related Art

Liquid crystal display (LCD) modules have been frequently used as a flat panel display through utilizing features such as thinness, lightness in weight, low level of electric power consumption and the like, and applications thereof have been increasing year by year as display devices for information such as mobile phones, personal digital assistances (PDA), personal computers and televisions. In recent years, properties demanded for liquid crystal display modules vary depending on their applications, but may include brightness (high luminance), visibility (widening of viewing angle), energy saving, thin and light modeling capability and the like. In particular, high luminance has been strongly desired.

Figure 8:
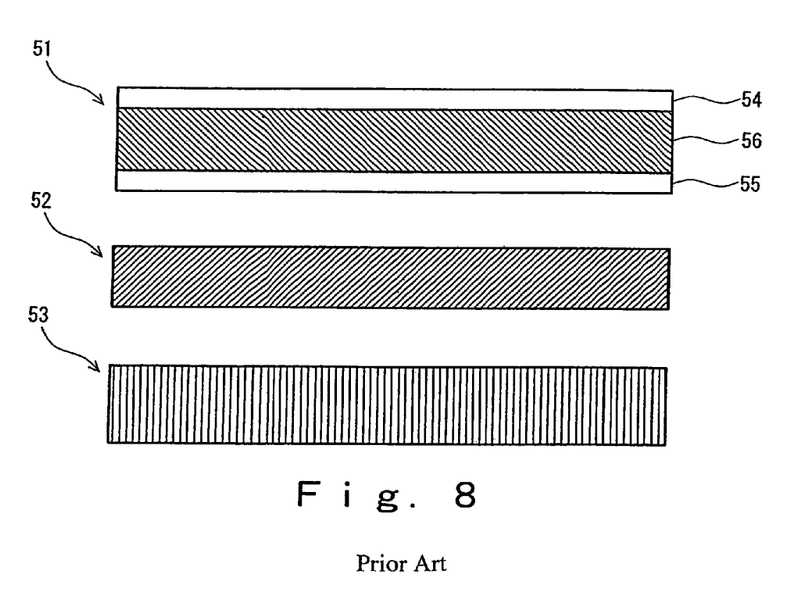
FIG. 8 shows a schematic cross-sectional view illustrating a general immediate beneath type liquid crystal display module.

Conventional common liquid crystal display modules have a structure in which as shown FIG. 8, a liquid crystal display element 51, a variety of optical sheets 52 and a backlight 53 are superposed from the front face side to the back face in this order. The liquid crystal display element 51 has a structure in which liquid crystal cell 56 is sandwiched between a pair of polarizing plates 54, 55, and various display modes such as TN and IPS were proposed. The backlight 53 allows the liquid crystal display element 51 to execute light emission by irradiating from the back face side, and modes such as edge light type (side light type), immediate beneath type and the like have been in widespread use. The various optical sheets 52 are superposed between the liquid crystal display element 51 and the backlight 53, and a light diffusion sheet, a prism sheet and the like are included having an optical function such as refraction and diffusion in an orientation along a normal line for the purpose of allowing the rays of light exited from the front face of the backlight 53 to enter into the entire face of the liquid crystal display element 51 efficiently and uniformly.

Generally used polarizing plates 54, 55 provided in the liquid crystal display element 51 are those which exhibit absorption dichroism, i.e., absorption of one directional component of a light accompanied by transmission of remaining polarization components. This type of the polarizing plates 54, 55 absorb 50% of the light, in principle, for achieving polarization, therefore, it falls under one great reason for deterioration of the utilization efficiency of the light in the liquid crystal display module.

In order to minimize the decrease in utilization efficiency of the light by the polarizing plates 54, 55, a technique of superposing a reflection polarizing plate (polarization splitter) on the back face side of the polarizing plate 55 positioned on the back face side in the liquid crystal display module, as well as a technique of using the reflection polarizing plate in place of the polarizing plate 55 positioned on the back face side were developed (for example, see JP-A-2005-106959, JP-T 9-506985 (the term "JP-T" as used herein means a published Japanese translation of a PCT application) and the like). According to this reflection polarizing plate, the polarizing plate 55 positioned on the back face side allows transmission axis components to transmit directly, while other polarization components are allowed to return to the lower side, thereby recycling the rays of light.

On the other hand, the optical sheets 52 such as a light diffusion sheet, a prism sheet and the like provided in the liquid crystal display module generally include a transparent substrate film made of a synthetic resin, optical layer(s) such as a light diffusion layer, a prism array layer and the like laminated on the front face of this substrate layer (see, for example, JP-A Nos. 2000-89007, 2004-4970 and the like). The conventional optical sheet 52 is constructed such that the optical layer having a particular structure performs optical functions such as refraction, diffusion and the like in an orientation along a normal line, however, control of polarization characteristics of transmitted rays of light was not intended thereby.

In conventional liquid crystal display modules, the luminance was not satisfactorily secured while maintaining requirements for LCD, i.e., thin and light modeling by merely improving optical waveguide plate, cold-cathode tube and the like of the backlight 53.

Also, under the current circumstances, even in the case of the aforementioned liquid crystal display modules in which such reflection polarizing plates are used, just approximately 75% of the utilization efficiency of the rays of light can be achieved in fact due to loss of the recycled light caused by thermal absorption, reflection and the like.

SUMMARY OF THE INVENTION

The present invention was made in view of these disadvantages, and an object of the present invention is to provide an optical unit which can markedly enhance utilization efficiency of rays of light and dramatically improving luminance and which are suited for immediate beneath type liquid crystal display modules and opposed edge light type liquid crystal display modules, and a liquid crystal display module using the same.

The present inventor elaborately investigated polarization characteristics of each constituent element of the liquid crystal display modules, and consequently found that decrease in utilization efficiency of the rays of light results from polarization of intensity of the rays of light reflected on the polarizing plate positioned on the back face side (back face side-polarizing plate) or on the reflection polarizing plate of the liquid crystal display elements followed by returning to the backlight, leading to inconsistency of the polarization orientation thereof with the orientation of the transmission axis of the back face side-polarizing plate or the reflection polarizing plate.

Consequently, one aspect of the present invention made for solving the aforementioned problems is an optical unit including a rectangular layered structural member having a reflection polarizing plate that splits reflected beams and transmitted beams on the basis of polarization characteristics, and an optical sheet superposed on the back face side of the reflection polarizing plate, wherein the optical sheet includes a resin substrate film having an optical anisotropy, and the absolute value of the angle of the crystal orientation of the substrate film with respect to the transmission axial orientation of the reflection polarizing plate is $\pi/8$ or greater and $3\pi/8$ or less.

Since the optical unit has a reflection polarizing plate that splits reflected beams and transmitted beams on the basis of polarization characteristics, in the liquid crystal display module, polarization components that are parallel to the transmission axial orientation of the back face side-polarizing plate of the liquid crystal display element are allowed to transmit directly, while other polarization components are allowed to return to the lower side, thereby subjecting to recycling of the rays of light. Accordingly, utilization efficiency of the rays of light emitted from the lamp can be improved. Also, by thus constructing the optical unit to have an optical sheet superposed on the back face side of the reflection polarizing plate, with this optical sheet including a resin substrate film having an optical anisotropy, wherein the angle (absolute value) of the crystal orientation of the substrate film with respect to the transmission axial orientation of the reflection polarizing plate is $\pi/8$ or greater and $3\pi/8$ or less, in liquid crystal display modules, polarization orientation of the retroreflected rays of light, which alternate through reflection on the reflection polarizing plate to the backlight side (back face side) and reflection on the backlight to the front face side, can be converted into the transmission axial orientation of the reflection polarizing plate (i.e., transmission axial orientation of the back face side-polarizing plate of the liquid crystal display element) (hereinafter, this function referred to as "polarizing function of the retroreflected rays of light"). As a result, ratio of attainment of the retroreflected rays of light to the liquid crystal cell, and in turn, utilization efficiency of the rays of light emitted from the lamp can be enhanced. Because the optical unit effectively performs polarizing functions of the retroreflected rays of light described above, the polarization characteristics of the outgoing rays of light of the backlight can be suitably used for immediate beneath type liquid crystal display modules and opposed edge light type liquid crystal display modules which are comparably isotropic.

It is preferred that the optical unit further includes, a transparent media layer filled between the reflection polarizing plate and the optical sheet. By thus filling between the reflection polarizing plate and the optical sheet with the transparent media layer having a refractive index greater than that of the air, total reflection critical angle of the optical sheet on the front face becomes greater than that in the case of the air being interposed between the reflection polarizing plate and the optical sheet. Consequently, ratio of the rays of light exited from the front face of the optical sheet, in turn, utilization efficiency of the rays of light emitted from the lamp can be further enhanced.

The retardation value of the substrate film is preferably 70 nm or greater and 320 nm or less. The substrate film having such a retardation value optimizes the phase contrast such that the polarizing function of the retroreflected rays of light can be performed, whereby utilization efficiency of the rays of light can be markedly enhanced. Moreover, because the aforementioned numerical range of the retardation value is comparatively small as a retardation value for optimizing the phase contrast, ease of manufacture of the substrate film also becomes favorable.

Matrix resin constituting the substrate film is preferably polyethylene terephthalate or polycarbonate. This polyethylene terephthalate has a property to provide comparatively high retardation value, and the retardation value can be readily and certainly optimized as described above. Also, the retardation value can be readily regulated when polycarbonate is used.

It is desired that the optical sheet has an optical layer laminated on one face of the substrate film. The optical layer may be (a) one including multiple particles of a light diffusing agent and a binder therefor (light diffusion layer of light diffusion sheet), or (b) one having minute irregular shape having refractivity (prism array layer or the like of prism sheet). Because the optical sheet such as a light diffusion sheet and a prism sheet is generally used in liquid crystal display modules, by employing the substrate film having the aforementioned polarizing function of the retroreflected rays of light as the substrate film of the optical sheet generally provided as in the above manner, the polarizing function of the retroreflected rays of light can be imparted without leading to increase in number of the optical sheets to be provided in the liquid crystal display module, whereby utilization efficiency of the rays of light can be markedly enhanced, and luminance heightening and energy saving can be facilitated.

The optical sheet may have on another face of the substrate film a sticking preventive layer that includes beads dispersed in a binder. By thus providing the sticking preventive layer on the another face of the substrate film, sticking is prevented, for example, between the optical sheet and the optical waveguide plate, the prism sheet or the like disposed to the back face side in the liquid crystal display modules.

The liquid crystal display module made for solving the aforementioned problems comprises (a) a liquid crystal display element in which a liquid crystal cell is sandwiched between a pair of polarizing plates, (b) an optical unit overlaid on the back face side of the liquid crystal display element, and (c) a surface illuminant backlight of immediate beneath type or opposed edge light type overlaid on the back face side of the optical unit. The liquid crystal display module markedly enhances utilization efficiency of the rays of light emitted from the lamp, and thus luminance heightening, energy saving, and thin and light modeling which have been socially demanded these days can be facilitated because the optical unit has a polarizing function of the retroreflected rays of light reflected on the polarizing plate and the like as described above. Also, since the liquid crystal display module has an immediate beneath type or opposed edge light type backlight which has a comparably isotropic polarization characteristic of the outgoing rays of light, the polarizing function of the retroreflected rays of light can be effectively performed.

In the liquid crystal display module, the reflection polarizing plate of the optical unit can be provided as the back face side-polarizing plate of the liquid crystal display element. By thus substituting the back face side-polarizing plate of the liquid crystal display element for the reflection polarizing plate of the optical unit, decrease in number of the equipped polarizing plates can be intended, and in combination with the polarizing function of the retroreflected rays of light of the optical unit, additional enhancement of the utilization efficiency of the rays of light emitted from the lamp can be achieved.

When other optical sheet is provided between the liquid crystal display element and the backlight in the liquid crystal display module, a low-retardation film may be used as the substrate film of the other optical sheet. In general, liquid crystal display modules have multiple optical sheets such as light diffusion sheet, prism sheet and the like. When multiple optical sheets are provided in this manner, optimization and regulability of the polarizing function of the retroreflected rays of light can be facilitated by imparting only to the substrate film of particular one optical sheet the aforementioned polarizing function of the retroreflected rays of light, while preventing conversion of the polarization orientation of the transmitted rays of light by other optical sheet.

Herein, the term "optical sheet" refers to such sheets also conceptually involving the aforementioned substrate film alone. The term "polarization orientation of the rays of light" means a direction on the plane with maximum polarization components of the rays of light. The term "angle of crystal orientation of the substrate film with respect to the transmission axial orientation of the reflection polarizing plate" refers to the angle on the plane observed from the front face side, and means the angle represented by "+" for the clockwise rotation, while by "−" for the counterclockwise rotation. The "front face side" means the side of observation of the display of the liquid crystal display module, or that when incorporated in the liquid crystal display module. The term "back face side" means the opposite side of the front face side. The term "retardation value (Re)" is a value calculated according to the formula: Re=(ny−nx)d, provided that the phase advancing axial orientation and phase retarding axial orientation, which are mutually orthogonal, among the crystallographic axial orientations on the plane of the front face of the substrate film is designated as x orientation and y orientation, respectively; the thickness of the substrate film is designated as d; and refractive indexes in the x orientation and the y orientation are designated as nx and ny (nx≠ny). The term "low-retardation film" refers to a film having an absolute retardation value of equal to or less than 60 nm. The term "immediate beneath type liquid crystal display module" means a liquid crystal display module having an immediate beneath type backlight. The term "opposed edge light type liquid crystal display module" means a liquid crystal display module having an opposed edge light type backlight. The term "opposed edge light type backlight" means an edge light type backlight in which one or multiple lamps are disposed on the opposite side of the optical waveguide plate.

As in the foregoing, the optical unit of the present invention has a function to actively convert the polarization orientation of the retroreflected rays of light reflected on the reflection polarizing plate to the transmission axial orientation of the reflection polarizing plate. Accordingly, the liquid crystal display module of the present invention having such an optical unit markedly enhances utilization efficiency of the rays of light emitted from the lamp, and thus luminance heightening, energy saving, and thin and light modeling which have been socially demanded these days can be facilitated.

BRIEF DESCRIPTION OF THE DRAWINGS

FIGS. 2 (a) and (b) show schematic plan views illustrating a reflection polarizing plate and a substrate film provided in the optical unit shown in FIG. 1.

FIGS. 5 (a) and (b) show a schematic plan view and a schematic cross-sectional view illustrating an optical sheet (microlens sheet) that is different from the optical sheet of the optical unit shown in FIG. 4.

DESCRIPTION OF THE PREFERRED EMBODIMENTS

Hereinafter, embodiments of the present invention will be described in detail with appropriate references to the drawing.

Figure 1:
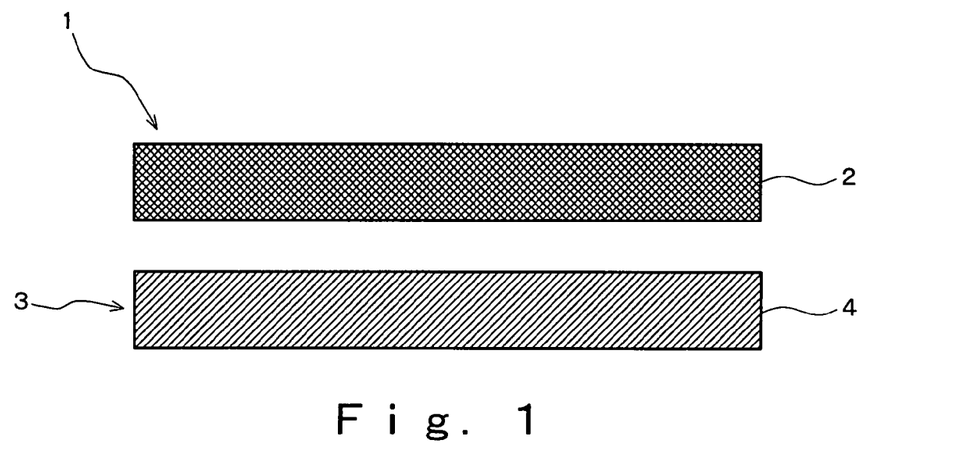
FIG. 1 shows a schematic cross-sectional view illustrating an optical unit according to one embodiment of the present invention.

Optical unit 1 shown in FIG. 1 is a layered structural body having a reflection polarizing plate 2, and an optical sheet 3 superposed on the back face side of this reflection polarizing plate 2 in a substantially parallel manner. The reflection polarizing plate 2 and the optical sheet 3 have a rectangular and substantially the same shape in plane.

Figure 2:
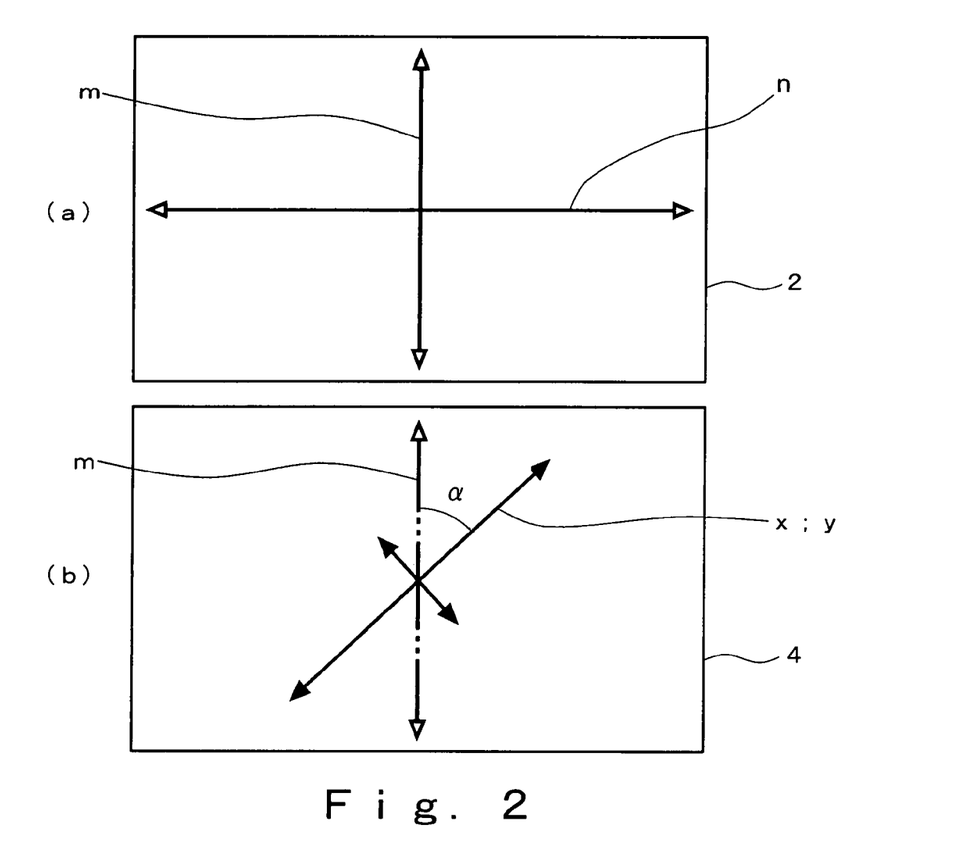

The reflection polarizing plate 2 has a function to split reflected beams and transmitted beams on the basis of polarization characteristics, and involves transmission axial orientation m and reflection axial orientation n that are mutually orthogonal on the plane as shown in FIG. 2 (a). Reflection polarizing plate 2, may be constructed, for example, of reflection polarizing film of the types made under trade name "D-BEF" manufactured by Sumitomo 3M Limited, and trade name "PCF" manufactured by NITTO DENKO CORPORATION. This reflection polarizing plate 2 is arranged in the liquid crystal display modules such that the transmission axial orientation m becomes in parallel to the transmission axial orientation of the back face side-polarizing plate of the liquid crystal display element, and in particular, in immediate beneath type liquid crystal display modules, it is usually arranged to be in parallel to the short side orientation (i.e., parallel to the linear lamp). Therefore, the reflection polarizing plate 2 is constructed such that the polarization components that run along the transmission axial orientation m that is parallel to the transmission axial orientation of the back face side-polarizing plate of the liquid crystal display element are transmitted among the rays of light incoming from the back face side, and that the polarization components that run along the reflection axial orientation n are recycled following reflection toward the back face side.

The optical sheet 3 is constituted with a resin substrate film 4 alone. As a material for forming this substrate film 4, a transparent, particularly colorless and transparent, synthetic resin is used. This synthetic resin is not particularly limited, and examples thereof include e.g., polyethylene terephthalate, polyethylene naphthalate, acrylic resins, polycarbonate, polystyrene, polyolefin, cellulose acetate, weather resistant vinyl chloride and the like. Among these synthetic resins, polyethylene terephthalate or polycarbonate that is highly transparent, has high strength, and the retardation value of which can be readily regulated as described later is preferred. Particularly, polyethylene terephthalate having improved flexural performance is preferred.

Thickness of the substrate film 4 (average thickness) is not particularly limited, but is preferably 10 μm or greater and 250 μm or less, particularly preferably 20 μm or greater and 188 μm or less. When the substrate film 4 has a thickness being below the above range, disadvantages such as increasing possibility of generation of curling upon coating a polymer composition for forming the light diffusion layer or the like on the front face of the substrate film 4 as described later, and difficulty in handling, and the like may be caused. To the contrary, when the substrate film 4 has a thickness being beyond the above range, luminance of the liquid crystal display module may be lowered, and further may result in increase of thickness of the liquid crystal display module, which may be opposite to the demand for thin modeling.

The substrate film 4 has an optical anisotropy, and specifically, has a birefringence exhibiting different refractive indices in the horizontal orientation, involving a crystal orientation (x; y) on the plane as shown in FIG. 2 (b). Such a substrate film 4 has an optimized angle of the crystal orientation (x; y) and retardation value, and constituted such that the polarization orientation of the transmitted rays of light is converted into an intended orientation.

Lower limit of the absolute value of the angle α of the crystal orientation (x; y) of the substrate film 4 with respect to the transmission axial orientation m of the reflection polarizing plate 2 is preferably π/8, and particularly preferably 3π/16. To the contrary, the upper limit of the absolute value of the angle α of the crystal orientation (x; y) of the substrate film 4 is preferably 3π/8, and particularly preferably 5π/16. Moreover, the absolute value of the angle α of the crystal orientation (x; y) of the substrate film 4 is most preferably 7π/4. The substrate film 4 exhibiting the angle α of the crystal orientation (x; y) falling within the above range can effectively convert the polarization orientation of the retroreflected rays of light reflected on the reflection polarizing plate 2 into the transmission axial orientation m of the reflection polarizing plate 2. The angle α of the crystal orientation (x; y) was specified in terms of the absolute value as described above because the aforementioned polarizing function of the retroreflected rays of light may be exerted similarly in both cases in which the angle α of the crystal orientation (x; y) shows plus and minus values with respect to the transmission axial orientation m of the reflection polarizing plate 2.

The lower limit of the retardation value of the substrate film 4 is preferably 70 nm, and particularly preferably 110 nm. To the contrary, the upper limit of the retardation value of the substrate film 4 is preferably 320 nm, and particularly preferably 170 nm. The substrate film 4 having a retardation value falling within this range can effectively convert the polarization orientation of the retroreflected rays of light reflected on the reflection polarizing plate 2 into the transmission axial orientation m of the reflection polarizing plate 2, and ease of manufacture is also favorable.

Process for producing the substrate film 4 is not particularly limited as long as the aforementioned angle α of the crystal orientation and the retardation value can be obtained. The angle α of the crystal orientation of the substrate film 4 can be, for example, regulated to fall within the range according to the present invention by adjusting stretching force, temperature and the like in the processing of uniaxial stretching of polyethylene terephthalate or the like, as well as by adjusting the position and angle of punching in the processing of punching of the biaxially stretched film. Moreover, the retardation value of the substrate film 4 can be regulated by way of, for example, stretching force, temperature, film thickness or the like in the processing of stretching.

Since the optical unit 1 has the reflection polarizing plate 2, in the liquid crystal display module, polarization components that are parallel to the transmission axial orientation of the back face side-polarizing plate of the liquid crystal display element are allowed to transmit directly, while other polarization components are allowed to return to the lower side, thereby subjecting to recycling of the rays of light. Accordingly, utilization efficiency of the rays of light emitted from the lamp can be improved. In addition, since the optical unit 1 has the substrate film 4 on the back face side of the reflection polarizing plate 2, in the liquid crystal display module, polarization orientation of the retroreflected rays of light, which alternate through reflection on the reflection polarizing plate 2 to the backlight side and reflection on the backlight to the front face side, can be effectively converted into the transmission axial orientation m of the reflection polarizing plate 2. Accordingly, utilization efficiency of the rays of light can be improved. In addition, the optical unit 1 can be suitably used in the liquid crystal display modules having an immediate beneath type backlight or opposed edge light type backlight having a comparably isotropic polarization characteristic of the outgoing rays of light, and thus the aforementioned polarizing function of the retroreflected rays of light can be effectively exerted.

Figure 3:
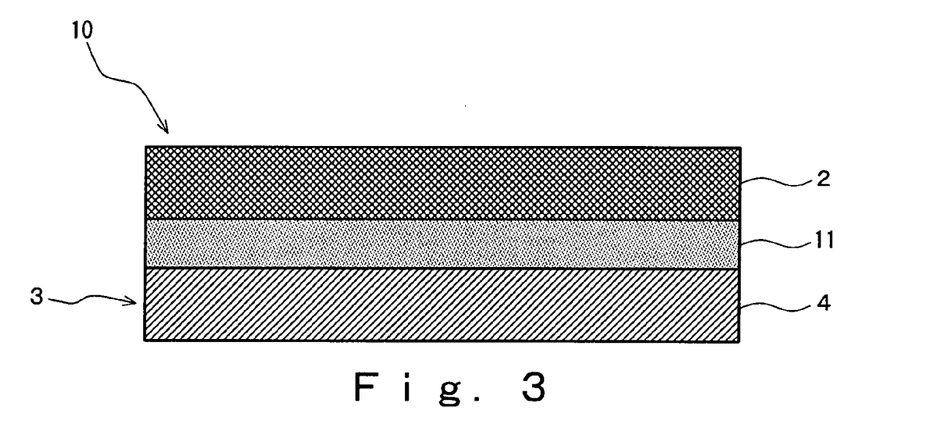
FIG. 3 shows a schematic cross-sectional view illustrating an optical unit according to one embodiment that is different from the optical unit shown in FIG. 1.

Optical unit 10 shown in FIG. 3 is a rectangular layered structural body having a reflection polarizing plate 2, an optical sheet 3 superposed on the back face side of this reflection polarizing plate 2 in a substantially parallel manner, and a transparent media layer 11 filled to laminate between the reflection polarizing plate 2 and the optical sheet 3. The reflection polarizing plate 2 and the optical sheet 3 are similar to those in the optical unit 1 shown in FIG. 1 described above, therefore, their explanation is omitted through referring to with the identical numerical signs.

Transparent medium that forms the transparent media layer 11 has transparency because of needs for transmission of the rays of light to the front face side, and has a greater refractive index than the air. The transparency of this transparent media layer 11 refers to, in a conceptual sense, include transparency with color, translucency and the like, in addition to transparency without color. Specific examples of this transparent medium include agglutinants, adhesives for lamination, melt extruded resins, silicone oils and the like.

As the agglutinant, any of known variety of ones can be used, but in general, they are prepared by adding a tackfier and a plasticizer to a thermoplastic resin. Specific examples thereof include solvent-based agglutinants, emulsion-based agglutinants and the like.

Examples of the adhesive for lamination include e.g., adhesives for dry lamination, adhesives for wet lamination, adhesives for hot melt lamination, adhesives for nonsolvent lamination and the like. Among these adhesives for lamination, adhesives for dry lamination that are excellent in the adhesion strength, durability, weather resistance and the like are particularly preferred.

Examples of the adhesive for dry lamination include e.g., polyvinyl acetate-based adhesives, polyacrylic ester-based adhesives composed of a homopolymer of a ethyl, butyl, 2-ethylhexyl ester or the like of acrylic acid, or a copolymer of the same with methyl methacrylate, acrylonitrile, styrene or the like; cyano acrylate-based adhesives; ethylene copolymer-based adhesives composed of a copolymer or the like of ethylene with a monomer such as vinyl acetate, ethyl acrylate, acrylic acid, methacrylic acid or the like; cellulose-based adhesives; polyester-based adhesives; polyamide-based adhesives; polyimide-based adhesives; amino resin-based adhesives composed of an urea resin, a melamine resin or the like; phenol resin-based adhesives; epoxy-based adhesives; polyurethane-based adhesives; reactive (meth)acrylic adhesives; rubber-based adhesives composed of chloroprene rubber, nitrile rubber, styrene-butadiene rubber or the like; silicone-based adhesives; inorganic adhesives composed of alkali metal silicate, glass having a low melting point or the like; and the like. Among these adhesives for dry lamination, polyurethane-based adhesives are particularly preferred because time-dependent decrease of adhesion strength, and delamination can be prevented, and still further, deterioration such as yellowing and the like of the transparent media layer 11 can be reduced.

As the melt extruded resin one or two or more thermoplastic resin(s) such as, for example, polyethylene-based resins, polypropylene-based resins, acid modified polyethylene-based resins, acid modified polypropylene-based resins, ethylene-acrylic acid or methacrylic acid copolymers, SURLYN-based resins, ethylene-vinyl acetate copolymers, polyvinyl acetate-based resins, ethylene-acrylic ester or methacrylic ester copolymers, polystyrene-based resins, polyvinyl chloride-based resins and the like can be used.

When an extrusion lamination method is employed in which the melt extruded resin is used, it is desired that the opposing face to the lamination is subjected to a surface finishing treatment such as anchor coating treatment or the like.

The lower limit of the amount of lamination (calculated based on the solid content) of the transparent media layer 11 is preferably 1 g/m², and particularly preferably 3 g/m². To the contrary, the upper limit of the amount of lamination of the transparent media layer 11 is preferably 10 g/m², and particularly preferably 7 g/m². When the amount of lamination of the transparent media layer 11 is smaller than the above lower limit, adhesion strength may not be attained. On the other hand, when the amount of lamination of the transparent media layer 11 is greater than the above upper limit, strength and durability of the laminated layer may be deteriorated.

In the transparent medium for forming the transparent media layer 11 such as the agglutinant, the adhesive for lamination, the melt extruded resin or the like may be blended a variety of additives ad libitum such as e.g., a solvent, a lubricant, a crosslinking agent, an antioxidant, an ultraviolet ray absorbing agent, a light stabilizer, a filler, a reinforcing fiber, a reinforcing agent, an antistatic agent, a fire retardant, a flame retardant, a foaming agent, a fungicide, a pigment and the like for the purpose of improving and modifying the handleability, heat resistance, weather resistance, mechanical properties and the like.

The optical unit 10, similarly to the optical unit 1 shown in FIG. 1, allows the polarization components other than those in the transmission axial orientation of the back face side-polarizing plate of the liquid crystal display element in the liquid crystal display module to return to the back face side by the reflection polarizing plate 2, thereby subjecting to recycling of the rays of light. Further, due to the substrate film 4, the polarization orientation of the retroreflected rays of light can be effectively converted into the transmission axial orientation m of the reflection polarizing plate 2. Accordingly, utilization efficiency of the rays of light emitted from the lamp can be improved. In addition, the optical unit 10 can enhance the utilization efficiency of the rays of light emitted from the lamp in the liquid crystal display module through increasing the rays of light exited from the front face of the substrate film 4 as a result of enlarged total reflection critical angle on the substrate film 4 front face (interface with the transparent media layer 11) by the transparent media layer 11 filled in the gap between the reflection polarizing plate 2 and the optical sheet 3. In particular, when the used transparent media layer 11 has a refractive index that is greater than the refractive index of the substrate film 4 in the optical unit 10, total reflection of the rays of light that enter in the interface with the transparent media layer 11 from the substrate film 4 side can be prevented, whereby utilization efficiency of the rays of light emitted from the lamp in the liquid crystal display module can be markedly enhanced. Moreover, the optical unit 10 can improve the handleability, strength, durability and the like because the state of lamination of the reflection polarizing plate 2 and the substrate film 4 is fixed through using the agglutinant, the adhesive for lamination or the melt extruded resin as a material for forming the transparent media layer 11.

Figure 4:
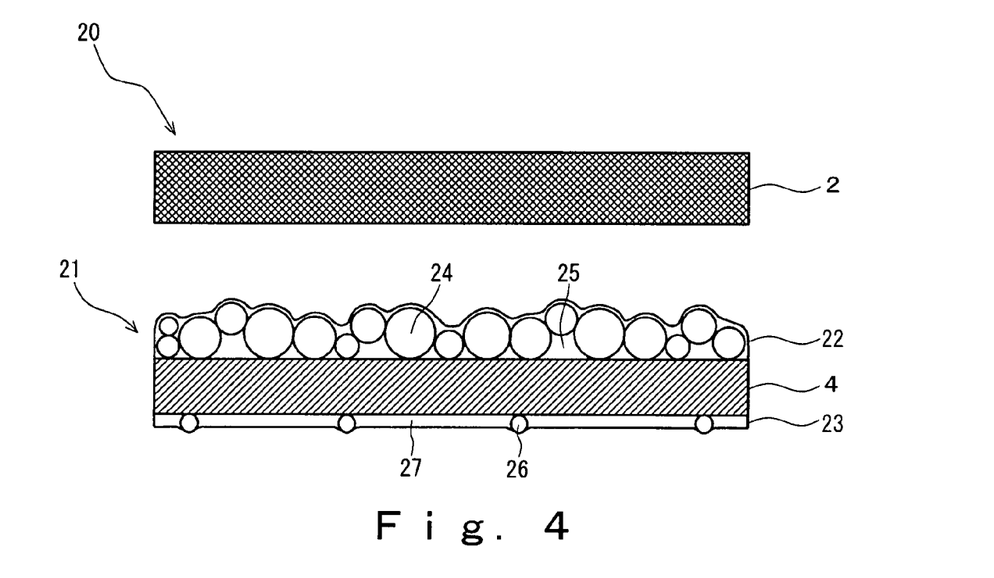
FIG. 4 shows a schematic cross-sectional view illustrating an optical unit according to one embodiment that is different from the optical units shown in FIG. 1 and FIG. 3.

Optical unit 20 shown in FIG. 4 is a rectangular layered structural body having a reflection polarizing plate 2, and an optical sheet 21 superposed on the back face side of this reflection polarizing plate 2 in a substantially parallel manner. The optical sheet 21 is a light diffusion sheet that has a light spread function to allow transmitted rays of light to be diffused (in detail, directional spread function to permit light condensing to the normal line orientation side while allowing to be diffused). The optical sheet 21 has the substrate film 4, an optical layer (light diffusion layer) 22 laminated on the front face of the substrate film 4, and a sticking preventive layer 23 laminated on the back face of the substrate film 4. The reflection polarizing plate 2 and the substrate film 4 of the optical unit 20 are similar to those in the optical unit 1 shown in FIG. 1 involving the constitution as well as the crystal orientation (x; y) and the like, therefore, their explanation is omitted through referring to with the identical numerical signs.

The optical layer 22 includes multiple particles of a light diffusing agent 24 provided over the front face of the substrate film 4 in a substantially uniform manner, and a binder 25 for the multiple particles of the light diffusing agent 24. The multiple particles of the light diffusing agent 24 are covered by the binder 25. The multiple particles of the light diffusing agent 24 included in the optical layer 22 in such a manner enable uniform diffusion of the rays of light which transmit the optical layer 22 from the back side to the front side. Moreover, micro recessions and protrusions are formed on the surface of the optical layer 22 in a substantially uniform manner by the multiple particles of the light diffusing agent 24. Owing to a refracting action of the micro recessions and protrusions like a lens thus formed on the front face of the optical sheet 21, the rays of light can be more efficiently diffused. Although the average thickness of the optical layer 22 is not particularly limited, it may be, for example, approximately 1 μm or greater and 30 μm or less.

The light diffusing agent 24 may be in the form of particles having a property to allow the rays of light to be diffused, and its candidates can be generally classified into inorganic fillers and organic fillers. Examples of the inorganic filler which may be used include e.g., silica, aluminum hydroxide, aluminum oxide, zinc oxide, barium sulfide, magnesium silicate, or any mixtures thereof. Examples of the material which may be used for the organic filler include e.g., acrylic resins, acrylonitrile resins, polyurethane, polyvinyl chloride, polystyrene, polyacrylonitrile, polyamide and the like. Among them, acrylic resins having high transparency are preferred, and in particular, polymethyl methacrylate (PMMA) is preferred.

Shape of the light diffusing agent 24 is not particularly limited, and examples thereof include e.g., spherical, spindle, needle-like, rod-like, cubic, plate-like, squamous, fibrous and the like. In particular, the shape of spherical beads excellent in the light diffusibility is preferred.

The lower limit of the average particle size of the light diffusing agent 24 is preferably 1 μm, particularly preferably 2 μm, and still more preferably 5 μm. In contrast, the upper limit of the mean particle size of the light diffusing agent 24 is preferably 50 μm, particularly preferably 20 μm, and still more preferably 15 μm. When the mean particle size of the light diffusing agent 24 is below the above range, less recessions and protrusions are provided on the surface of the optical layer 22 formed by the light diffusing agent 24, which may lead to the probability of unsatisfactory light diffusing property required for the light diffusion sheet. To the contrary, when the mean particle size of the light diffusing agent 24 is beyond the above upper range, thickness of the optical sheet 21 is increased, and uniform diffusion may be difficult.

It is preferred that the lower limit of the amount of the light diffusing agent 24 (incorporated amount per 100 parts of the substrate polymer in the polymer composition being the material for forming the binder 25, which is calculated on the basis of the solid content) be 10 parts, particularly 20 parts, and still more 50 parts, and that the upper limit of the incorporated amount be 500 parts, particularly 300 parts, and still more 200 parts. The amount of the incorporated light diffusing agent 24 below the above range may result in insufficient light diffusibility, while the amount of the incorporated light diffusing agent 24 beyond the above range, to the contrary, may result in deterioration of the effect of fixing the light diffusing agent 24. High light diffusibility is not required in case of so called light diffusion sheets for upper use disposed to the front face side of the prism sheet, therefore, the amount of the incorporated light diffusing agent 24 may be preferably 10 parts or greater and 40 parts or less, particularly preferably 10 parts or greater and 30 parts or less.

The binder 25 can be formed by allowing a polymer composition containing a substrate polymer to be crosslinked and cured. This binder 25 disposes and fixes the light diffusing agent 24 on the front face of the substrate film 4 in a manner to provide substantially uniform density. Furthermore, for example, a fine inorganic filler, a curing agent, a plasticizer, a dispersant, any of various levelling agents, an ultraviolet ray-absorbing agent, an anti-oxidizing agent, a viscosity improving agent, a lubricant, a light stabilizer and the like may be blended ad libitum in the polymer composition for forming the binder 25, in addition to the substrate polymer.

The aforementioned substrate polymer is not particularly limited, and examples thereof include e.g., acrylic resins, polyurethane, polyesters, fluorine-based resins, silicone-based resins, polyamide imide, epoxy resins, ultraviolet-curable resins and the like. One or two or more of these polymers may be used as a mixture. Particularly, a highly processable polyol that can be readily formed into the optical layer 22 by a means such as coating or the like is preferred as the substrate polymer. Furthermore, the substrate polymer per se which may be used for the binder 25 is preferably transparent, and particularly preferably transparent and colorless in light of improvement of the transmittivity of the rays of light.

Examples of the polyol include e.g., polyols obtained by polymerizing a monomer component including a hydroxyl group-containing unsaturated monomer, polyester polyols obtained under a condition with excess hydroxyl groups present, and the like. These may be used alone or two or more of them may be used as a mixture.

Examples of the hydroxyl group-containing unsaturated monomer include (a) hydroxyl group-containing unsaturated monomers such as e.g., 2-hydroxyethyl acrylate, 2-hydroxypropyl acrylate, 2-hydroxyethyl methacrylate, 2-hydroxypropyl methacrylate, allyl alcohol, homoallyl alcohol, cinnamic alcohol, and crotonyl alcohol, and (b) hydroxyl group-containing unsaturated monomers obtained by a reaction of a dihydric alcohol or an epoxy compound such as e.g., ethylene glycol, ethylene oxide, propylene glycol, propylene oxide, butylene glycol, butylene oxide, 1,4-bis (hydroxymethyl)cyclohexane, phenylglycidyl ether, glycidyl decanoate or PRACCEL FM-1 (manufactured by Daicel Chemical Industries, Ltd.), with an unsaturated carboxylic acid such as e.g., acrylic acid, methacrylic acid, maleic acid, fumaric acid, crotonic acid or itaconic acid. The polyol can be manufactured by polymerizing one or two or more selected from these hydroxyl group-containing unsaturated monomers.

Moreover, the polyol can be also manufactured by polymerizing one or two or more ethylenic unsaturated monomers selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycidyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetone acrylamide, ethylene, propylene, isoprene and the like, with the hydroxyl group-containing unsaturated monomer selected from those in the above (a) and (b).

The polymer obtained by polymerizing the monomer component including the hydroxyl group-containing unsaturated monomer may have a number average molecular weight of 1000 or greater and 500000 or less, and preferably 5000 or greater and 100000 or less. Furthermore, the hydroxyl value may be 5 or greater and 300 or less, preferably 10 or greater and 200 or less, and more preferably 20 or greater and 150 or less.

The polyester polyol obtained under a condition with excess hydroxyl groups being present can be manufactured by allowing a reaction of (c) a polyhydric alcohol such as e.g., ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, 2,2,4-trimethyl-1,3-pentanediol, trimethylolpropane, hexanetriol, glycerin, pentaerythritol, cyclohexanediol, hydrogenated bisphenol A, bis(hydroxymethyl)cyclohexane, hydroquinone bis(hydroxyethyl ether), tris(hydroxyethyl)isocyanurate or xylylene glycol with (d) a polybasic acid such as e.g., maleic acid, fumaric acid, succinic acid, adipic acid, sebacic acid, azelaic acid, trimellitic acid, terephthalic acid, phthalic acid or isophthalic acid, under a condition in which number of the hydroxyl groups in the polyhydric alcohol such as propanediol, hexanediol, polyethylene glycol, trimethylolpropane or the like is greater than number of the carboxy groups of the aforementioned polybasic acid.

The polymer obtained by polymerizing the monomer component including the hydroxyl group-containing unsaturated monomer may have a number average molecular weight of 500 or greater and 300000 or less, and preferably 2000 or greater and 100000 or less. Furthermore, the hydroxyl value may be 5 or greater and 300 or less, preferably 10 or greater and 200 or less, and more preferably 20 or greater and 150 or less.

The polyol for use as the substrate polymer of the polymer composition may be preferably an acryl polyol which is obtained by polymerizing the aforementioned polyester polyol, and a monomer component comprising the hydroxyl group-containing unsaturated monomer, and which has a (meth)acrylic unit or the like. The binder 25 including the polyester polyol or acryl polyol as the substrate polymer is highly weather-resistant, and yellowing of the optical layer 22 and the like can be suppressed. Either one of this polyester polyol or the acryl polyol may be used, alternatively, both of them may be used.

Number of the hydroxyl groups in the polyester polyol and the acryl polyol is not particularly limited as long as it is two or more per molecule, however, when the hydroxyl value in the solid content is equal to or less than 10, crosslinking points may be reduced and thus, film physical properties such as solvent resistance, water resistance, heat resistance, surface hardness and the like are liable to be decreased.

A fine inorganic filler may be included in the polymer composition that forms the binder 25. By thus including the fine inorganic filler in this binder 25, heat resistance of the optical layer 22, and in turn, of the optical sheet 21 may be improved. Inorganic matter that constitutes this fine inorganic filler is not particularly limited, but an inorganic oxide is preferred. This inorganic oxide is defined as any one of a variety of oxygen-containing metal compounds in which a metal element forms a three dimensional network predominantly via bonds with an oxygen atom. The metal element that constitutes the inorganic oxide is preferably an element selected from, for example, those in the group II-VI of the periodic table of the elements, and more preferably an element selected from those in the group III-V of the periodic table of the elements. Particularly, an element selected from Si, Al, Ti and Zr is preferred. Colloidal silica in which the metal element is Si is most preferred as the fine inorganic filler in terms of the effect to improve the heat resistance and uniform dispersibility. Also, the shape of the fine inorganic filler is not particularly limited, but may be an optional particle shape such as spherical, needle-like, plate-like, squamous, granular or the like.

The lower limit of the mean particle size of the fine inorganic filler is preferably 5 nm, and particularly preferably 10 nm. In contrast, the upper limit of the mean particle size of the fine inorganic filler is preferably 50 nm, and particularly preferably 25 nm. When the mean particle size of the fine inorganic filler is below the above range, surface energy of the fine inorganic filler becomes so high that aggregation or the like is likely to occur. To the contrary, the mean particle size of the fine inorganic filler being beyond the above range may cause white turbidity due to the influences of the short-wavelength, leading to failure in completely maintaining the transparency of the optical sheet 21.

The lower limit of the amount of the fine inorganic filler (amount of the incorporated inorganic substance component alone) per 100 parts by weight of the substrate polymer is preferably 5 parts, and particularly preferably 50 parts calculated on the basis of the solid content. In contrast, the upper limit of the amount of the incorporated fine inorganic filler is preferably 500 parts, more preferably 200 parts, and particularly preferably 100 parts. When the amount of the incorporated fine inorganic filler is below the above range, the optical sheet 21 may not develop heat resistance enough, to the contrary, when the amount is beyond the above range, blending in the polymer composition may be difficult, which may result in lowering of the light transmittivity of the optical layer 22.

As the fine inorganic filler, one having an organic polymer fixed on the surface thereof may be used. By thus using the organic polymer-fixed fine inorganic filler, improvement of dispersibility in the binder 25 and affinity with the binder 25 may be contemplated. This organic polymer is not particularly limited with respect to the molecular weight, shape, composition, presence of the functional group and the like, but an arbitrary organic polymer may be used. Furthermore, in connection with the shape of the organic polymer, any arbitrary shape such as a straight, branched or crosslinked structure may be used.

Specific examples of the resin constituting the organic polymer include e.g., (meth)acrylic resins, polystyrene, polyvinyl acetate, polyolefin such as polyethylene and polypropylene, polyvinyl chloride, polyvinylidene chloride, polyesters such as polyethylene terephthalate, copolymers of the same as well as these resins partially modified with a functional group such as an amino group, an epoxy group, a hydroxyl group or a carboxyl group, and the like. Among them, those including an organic polymer which contains a (meth)acrylic unit such as a (meth)acrylic resin, a (meth) acryl-styrene-based resin or a (meth)acryl-polyester-based resin as an essential component are suited because of their film formation ability. On the other hand, resins having miscibility with the substrate polymer of the aforementioned polymer composition are preferred, therefore, one having the same composition as the substrate polymer included in the polymer composition is most preferred.

The fine inorganic filler may include an organic polymer within the fine particle. Accordingly, adequate softness and toughness can be imparted to the inorganic substance that is a core of the fine inorganic filler.

As the organic polymer, one containing an alkoxy group may be preferably used, with the content of the same being 0.01 mmol or greater and 50 mmol or less per gram of the fine inorganic filler to which the organic polymer was fixed. Such an alkoxy group can improve affinity with a matrix resin that constitutes the binder 25, and dispersibility in the binder 25.

The alkoxy group described above means an RO group bound to a metal element that forms the skeleton of the fine particle. R herein represents an alkyl group which may be substituted, and the RO group in the fine particle may be the same or different. Specific examples of R include methyl, ethyl, n-propyl, isopropyl, n-butyl and the like. It is preferred that a metal alkoxy group be used which includes the same metal as that constituting the fine inorganic filler. When the fine inorganic filler is colloidal silica, an alkoxy group including silicon as the metal may be preferably used.

Although percentage content of the organic polymer in the fine inorganic filler to which the organic polymer was fixed is not particularly limited, its content is preferably equal to or greater than 0.5% by weight and equal to or less than 50% by weight based on the fine inorganic filler.

It is preferred that an organic polymer having a hydroxyl group is used as the organic polymer to be fixed on the fine inorganic filler, and that at least one selected from polyfunctional isocyanate compounds having two or more functional groups that react with a hydroxyl group, melamine compounds and aminoplast resins is included in the polymer composition that constitutes the binder 25. Accordingly, the fine inorganic filler and the matrix resin of the binder 25 are bound via a crosslinking structure, leading to excellent stability upon preservation, stain resistance, flexibility, weather resistance and the like. Furthermore, the resulting coated film can be glossy.

As the aforementioned substrate polymer, a polyol having a cycloalkyl group is preferred. By thus introducing a cycloalkyl group into the polyol as the substrate polymer constituting the binder 25, hydrophobicity of the binder 25 may be elevated to improve water repellency, water resistance and the like. Accordingly, deflection resistance, size stability and the like of the optical sheet 21 under high temperature and high humidity conditions can be improved. Additionally, basic film coating performances such as weather resistance, hardness, bulky feeling, solvent resistance and the like of the optical layer 22 may be improved. Moreover, affinity with the fine inorganic filler to which the organic polymer was fixed on the surface thereof, and uniform dispersibility of the fine inorganic filler may be further favorable.

The cycloalkyl group is not particularly limited, and examples thereof include e.g., cyclobutyl groups, cyclopentyl groups, cyclohexyl groups, cycloheptyl groups, cyclooctyl groups, cyclononyl groups, cyclodecyl groups, cycloundecyl groups, cyclododecyl groups, cyclotridecyl groups, cyclotetradecyl groups, cyclopentadecyl groups, cyclohexadecyl groups, cycloheptadecyl groups, cyclooctadecyl groups and the like.

The polyol having the cycloalkyl group is obtained by copolymerization of a polymerizable unsaturated monomer having a cycloalkyl group. Such a polymerizable unsaturated monomer having a cycloalkyl group is a polymerizable unsaturated monomer having at least one cycloalkyl group within the molecule. This polymerizable unsaturated monomer is not particularly limited, and examples thereof include e.g., cyclohexyl(meth)acrylate, methylcyclohexyl(meth)acrylate, tert-butylcyclohexyl(meth)acrylate, cyclododecyl(meth) acrylate and the like.

Also, isocyanate may be included as a curing agent in the polymer composition. By thus including the isocyanate curing agent in the polymer composition, even more rigid crosslinking structure is provided, thereby further improving the physical film properties of the optical layer 22. Similar substance to the polyfunctional isocyanate compound as described above may be used as the isocyanate. Among all, aliphatic isocyanate is preferred which prevents the coated film from yellowing.

Particularly, when the polyol is used as the substrate polymer, any one of hexamethylene diisocyanate, isophorone diisocyanate and xylene diisocyanate, or two or more thereof as a mixture may be used as the curing agent to be blended in the polymer composition. When such a curing agent is used, velocity of the curing reaction of the polymer composition is elevated, therefore, lowering of the velocity of the curing reaction due to the cationic antistatic agent can be sufficiently compensated even though a cationic substance that is responsible for dispersion stability of the fine inorganic filler is used as the antistatic agent. Also, elevation of the velocity of the curing reaction of the polymer composition is responsible for uniform dispersibility of the fine inorganic filler in the binder. As a consequence, the optical sheet 21 can markedly suppress deflection and yellowing due to heat, ultraviolet ray and the like.

Furthermore, an antistatic agent may be blended and kneaded in the polymer composition. Through forming a binder 25 from the polymer composition blended and kneaded with the antistatic agent in such a manner, the optical sheet 21 exerts an antistatic effect, thereby enabling the prevention of disadvantages resulting from electrification with static electricity such as attraction of dust, getting into a difficulty in overlaying with a prism sheet or the like, and the like. Moreover, although coating the antistatic agent on a surface results in stickiness or pollution of the surface, such negative effects may be reduced by blending and kneading it in the polymer composition. This antistatic agent is not particularly limited, and examples thereof which may be used include e.g., anionic antistatic agents such as alkyl sulfate, alkyl phosphate and the like; cationic antistatic agents such as quaternary ammonium salts, imidazoline compounds and the like; nonionic antistatic agents such as polyethyleneglycol-based compounds, polyoxyethylene sorbitan monostearate esters, ethanol amides and the like; polymeric antistatic agents such as polyacrylic acid, and the like. Among them, cationic antistatic agents are preferred having comparatively strong antistatic effects, which may exert an anti-static effect by merely adding in a small amount.

The sticking preventive layer 23 includes multiple beads 26 disposed on the back face of the substrate film 4, and a binder 27 for the multiple beads 26. This binder 27 is also formed by crosslinking and curing a polymer composition which is similar to one for the binder 25 of the optical layer 22 as described above. Moreover, as the material for the beads 26, similar ones to the light diffusing agent 24 for the optical layer 22 may be used. In addition, the thickness of the sticking preventive layer 23 (the thickness of the binder 27 portion, at a part where the beads 26 are not present) is not particularly limited, however for example, it is set to be around 1 μm or greater and 10 μm or less.

The amount of the incorporated beads 26 is set to be relatively small. The beads 26 are dispersed in the binder 27 spacing apart with each other. In addition, protrusions are formed on the under surface of the optical sheet 21 at the parts where the beads 26 are present. Thus, when this optical sheet 21 is disposed to overlay the front face of the optical waveguide plate or the like, the protruded portions of the beads 26 are brought into contact with the surface of the optical waveguide plate or the like, and thus contact of the entire surface of the back face of the optical sheet 21 with the optical waveguide plate or the like is avoided. Sticking between the optical sheet 21 and the optical waveguide plate is thereby prevented, leading to suppression of the lack in uniformity of the brightness of the window of a liquid crystal display apparatus.

Next, process for producing the optical sheet 21 will be explained below. The process for producing the optical sheet 21 comprises: (a) a step of preparing a composition for the optical layer through admixing the light diffusing agent 24 with a polymer composition that constitutes the binder 25; (b) a step of overlaying and curing the polymer composition on the front face of the substrate film 4 to form the optical layer 22; (c) a step of preparing a composition for the sticking preventive layer through admixing beads 26 with a polymer composition that constitutes the binder 27; and (d) a step of overlaying and curing the composition for the sticking preventive layer on the back face of the substrate film 4 to laminate the sticking preventive layer 23. Means for overlay to laminate the composition for the optical layer and the composition for the sticking preventive layer on the substrate film 4 is not particularly limited, but, for example, coating in which a bar coater, a blade coater, a spin coater, a roll coater, a gravure coater, a flow coater, a spray, screen printing or the like is used may be employed.

The optical unit 20, similarly to the optical unit 1 shown in FIG. 1, allows the polarization components other than those in the transmission axial orientation of the back face side-polarizing plate of the liquid crystal display element in the liquid crystal display module to return to the lower side by the reflection polarizing plate 2, thereby subjecting to recycling of the rays of light. Further, due to the substrate film 4, the polarization orientation of the retroreflected rays of light can be effectively converted into the transmission axial orientation m of the reflection polarizing plate 2. Accordingly, utilization efficiency of the rays of light can be improved. The optical unit 20 has an excellent light spread function (directional light diffusion function) due to the reflection and refraction at the interface of the light diffusing agent 24 included in the optical layer 22 of the optical sheet 21, and the refraction on the micro recessions and protrusions formed on the front face of the optical layer 22. Furthermore, since the substrate film 4 having the aforementioned polarizing function of the retroreflected rays of light is employed in the optical unit 20 as the substrate film of the light diffusion sheet generally provided in the liquid crystal display module, the polarizing function of the retroreflected rays of light can be imparted without leading to increase in number of the optical sheets to be provided in the liquid crystal display module, whereby utilization efficiency of the rays of light can be markedly enhanced, and luminance heightening and energy saving can be facilitated. Therefore, the optical unit 20 can markedly enhance utilization efficiency of the rays of light emitted from the lamp when it is used in liquid crystal display modules, and thus luminance heightening and energy-saving modeling, as well as space-saving modeling, in turn, can be facilitated.

Figure 5:
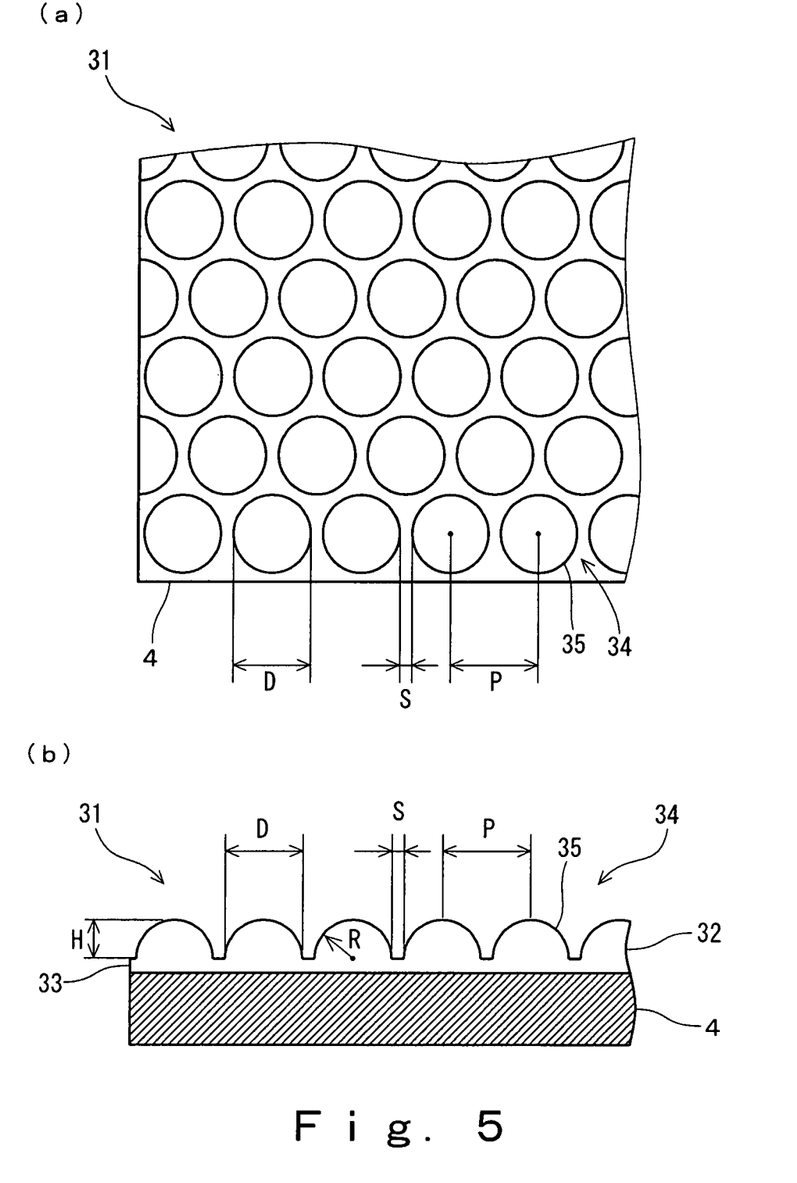

The optical unit 20 shown in FIG. 4 can have the optical sheet 31 shown in FIG. 5 in place of the optical sheet 21. Optical sheet 31 shown in FIG. 5 is a so called microlens sheet having optical functions such as high light condensation, and refraction and diffusion toward the side of the normal line orientation. The optical sheet 31 has the substrate film 4, and an optical layer 32 laminated on the front face of the substrate film 4. The substrate film 4 is similar to that in the optical unit 1 shown in FIG. 1, the explanation is omitted through referring to with the identical numerical signs.

The optical layer 32 has a sheet-shaped part 33 laminated on the front face of the substrate film 4, and a microlens array 34 formed on the front face of the sheet-shaped part 33. The optical layer 32 can be constructed with only the microlens array 34 without providing the sheet-shaped part 33. In other words, it is also possible to form the microlens array 34 directly on the front face of the substrate film 4.

The optical layer 32 is formed from a transparent, particularly, colorless and transparent synthetic resin, because transmission of rays of light is required. Examples of the synthetic resin which may be used for the optical layer 32 include e.g., polyethylene terephthalate, polyethylene naphthalate, acrylic resins, polycarbonate, polystyrene, polyolefin, cellulose acetate, weather resistant vinyl chloride, active energy beam curable resins, and the like. Among them, radiation curable resins such as ultraviolet ray curable resins, electron beam curable resins and the like being excellent in formability of the microlens array 34, as well as polyethylene terephthalate having excellent transparency and high strength are particularly preferred. In the optical layer 32 may be blended, for example, a filler, a plasticizer, a stabilizer, an antidegradant, a dispersant and the like, in addition to the aforementioned synthetic resin.

The microlens array 34 is constructed with a number of microlenses 35. This microlens 35 has a hemi-spherical shape (including the shape approximately to a hemisphere), and is provided to protrude on the front face side of the substrate film 4. The microlens 35 is not limited to the aforementioned hemi-spherical convex lens, but the microlens being a hemi-spherical concave lens is also acceptable. Such microlens being the hemi-spherical concave lens also has excellent optical functions similarly to the microlens 35 as described above.

The microlenses 35 are arranged on the front face of the substrate film 4 in a comparatively dense and geometrical manner. Specifically, the microlenses 35 are arranged on the front face of the substrate film 4 in a regular triangular lattice pattern. Therefore, pitches (P) of the microlenses 35, and distances (S) between the lenses have entirely constant values, respectively. This arrangement pattern enables the microlenses 35 to be arranged in a most dense manner. The arrangement pattern of the microlenses 35 is not limited to the aforementioned regular triangular lattice pattern which enables dense filling but, for example, any of regular tetragonal lattice patterns and random patterns can also be employed. According to this random pattern, appearance of the moire can be reduced which may be caused when the optical sheet 31 overlaid on other optical member.

It is preferred that the lower limit of the diameter (D) of the microlens 35 is 10 μm, particularly 100 μm, and further particularly 200 μm. In contrast, the upper limit of the diameter (D) of the microlens 35 is preferably 1000 μm, and particularly preferably 700 μm. When the diameter (D) of the microlens 35 is smaller than 10 μm, diffraction may greatly affect to facilitate the occurrence of decrement of the optical performances and color separation, thereby leading to deterioration of the quality. To the contrary, when the microlens 35 has a diameter (D) of greater than 1000 μm, increase in the thickness and lack in uniformity of the luminance are liable to be caused, which may thereby lead to deterioration of the quality. In addition, by setting the diameter (D) of the microlens 35 to be equal to or greater than 100 μm, the microlenses 35 decrease in number per unit area. Consequently, enlargement of the planar dimension of the optical sheet 31 being the microlens sheet can be readily performed, and thus technical and economic burdens in production can be reduced.

The lower limit of surface roughness (Ra) of the microlens 35 is preferably 0.01 μm, and particularly preferably 0.03 μm. In contrast, the upper limit of the surface roughness (Ra) of the microlens 35 is preferably 0.1 μm, and particularly preferably 0.07 μm. By thus setting the surface roughness (Ra) of the microlens 35 to be equal to or greater than the above lower limit, formation of the microlens array 34 of the optical sheet 31 is comparatively facilitated, and thus technical and economic burdens in terms of the production can be reduced. To the contrary, by setting the surface roughness (Ra) of the microlens 35 to be less than the above upper limit, scattering of the light on the front face of the microlens 35 is decreased. Consequently, a light condensing function and a refraction function to the side of the normal line orientation by the microlens 35 are enhanced, and high luminance of the front orientation can be achieved resulting from such favorable optical functions.

The lower limit of the height ratio (H/R) of the height (H) of the microlens 35 to the curvature radius (R) is preferably ⅝, and particularly preferably ¾. In contrast, the upper limit of this height ratio (H/R) is preferably 1. By thus making the height ratio (H/R) of the microlens 35 fall within the above range, a lens-like refracting action in the microlens 35 is effectively exhibited, and the optical functions such as light condensation and the like of the optical sheet 31 can be markedly enhanced.

The upper limit of the spacing ratio (S/D) of the distance (S; P-D) between the lenses to the diameter (D) of the microlenses 35 is preferably ½, and particularly preferably ⅕. By thus setting the distance (S) between the microlenses 35 to be equal to or less than the above upper limit, flat part which is not responsible for the optical functions can be decreased, and thus the optical functions such as light condensation and the like of the optical sheet 31 can be markedly improved.

The lower limit of the filling rate of the microlens 35 is preferably 40%, and particularly preferably 60%. By thus setting the filling rate of the microlens 35 to be equal to or greater than the above lower limit, occupied area of the microlens 35 in the front face of the optical sheet 31 can be increased, and thus the optical functions such as light condensation and the like of the optical sheet 31 can be markedly improved.

Numerical ranges of the aforementioned height ratio (H/R), spacing ratio (S/D) and filling rate were deduced on the basis of luminance analysis simulation by nonsequential tracing of the rays of light using a Monte Carlo method.

The lower limit of the refractive index of the material constituting the optical layer 32 is preferably 1.3, and particularly preferably 1.45. In contrast, the upper limit of the refractive index of this material is preferably 1.8, and particularly preferably 1.6. Within this range, the refractive index of the material constituting the optical layer 32 is most preferably 1.5. By thus making the refractive index of the material constituting the optical layer 32 fall within the above range, a lens-like refracting action in the microlens 35 is effectively exhibited, and the optical functions such as light condensation and the like of the optical sheet 31 can be further enhanced.

Process for producing the optical sheet 31 is not particularly limited as long as one having the construction as described above can be formed, and any of various processes can be adopted. Specific examples of the process for producing the optical sheet 31 include those in the followings:

(a) a process for forming the optical sheet 31 by laminating a synthetic resin and the substrate film 4 in this order in a sheet mold having an inverted shape of the front face of the microlens array 34, and stripping off the sheet mold;

(b) a process in which a resin formed into a sheet is heated again, which is sandwiched between a metal plate and a mold having an inverted shape of the front face of the microlens array 34, together with the substrate film 4, and then they are pressed to transfer the shape;

(c) an extrusion sheet forming process in which a molten resin and the substrate film 4 are passed through a nip between a roll mold having, on its inner circumference, an inverted shape of the front face of the microlens array 34 and another roll to transfer the shape;

(d) a process in which an ultraviolet ray curable resin is coated on the substrate film 4, pressed on a sheet mold, a mold or a roll mold having the inverted shape that is similar to the aforementioned one to transfer the shape to the uncured ultraviolet ray curable resin, and then the ultraviolet ray curable resin is exposed to an ultraviolet ray to permit curing;

(e) a process in which an uncured ultraviolet ray curable resin is filled for coating in a mold or a roll mold having the inverted shape that is similar to the aforementioned one, pressing it with the substrate film 4 to be uniform, and then the ultraviolet ray curable resin is exposed to an ultraviolet ray to permit curing;

(f) a process in which an uncured (liquid) ultraviolet ray curable resin or the like is sprayed or discharged from a minute nozzle such that the microlenses 35 are formed on the substrate film 4, and is then cured;

(g) A process in which an electron beam curable resin is used in place of the ultraviolet ray curable resin in the above processes (d) to (f), and the like.

In the method of manufacturing the mold having an inverted shape of the microlens array 34, it can be manufactured by, for example: producing a microlens array model through forming a patchy spatial pattern with a photoresist material on a substrate and subjecting this spatial pattern to heat fluidization to thereby make a curved face; laminating a metal layer on the front face of this microlens array model by electroforming; and peeling off this metal layer. Also, as the process for producing the aforementioned microlens array model, a process described in the above item (f) can be employed.

According to the method of the manufacture as described above, the microlens array 34 having an arbitrary shape is formed in an easy and accurate manner. Therefore, the diameter (D), the height ratio (H/R), the spacing ratio (S/D), the filling rate and the like of the microlenses 35 constructing the microlens array 34 can be regulated in an easy and accurate manner. As a result, the optical functions of the optical sheet 31 can be controlled in an easy and accurate manner.

The optical sheet 31 has optical functions such as high light condensation, refraction to the normal line orientation, diffusion and the like by means of the microlens array 34. In addition, the optical functions can be controlled in an easy and accurate manner. Thus, the optical sheet 31 can control, for example, the peak direction of the incoming rays of light to the prism sheet of the backlight unit to give the most suitable angle of gradient for refraction toward the normal line orientation. The optical unit 20 having the optical sheet 31 in place of the optical sheet 21, similarly to the optical unit 1 shown in FIG. 1, also allows the polarization components other than those in the transmission axial orientation of the back face side-polarizing plate of the liquid crystal display element in the liquid crystal display module to return to the lower side by the reflection polarizing plate 2, thereby subjecting to recycling of the rays of light. Further, due to the substrate film 4, the polarization orientation of the retroreflected rays of light can be effectively converted into the transmission axial orientation m of the reflection polarizing plate 2. Accordingly, utilization efficiency of the rays of light can be improved. Furthermore, since the substrate film 4 having the aforementioned polarizing function of the retroreflected rays of light is employed, in the optical unit 20 having the optical sheet 31, as the substrate film of the optical sheet provided in the liquid crystal display module, the polarizing function of the retroreflected rays of light can be imparted without leading to increase in number of the optical sheets to be provided in the liquid crystal display module, whereby utilization efficiency of the rays of light can be markedly enhanced, and luminance heightening and energy saving can be facilitated. Therefore, the optical unit 20 having the optical sheet 31 also can markedly enhance utilization efficiency of the rays of light emitted from the lamp when it is used in liquid crystal display modules, and thus luminance heightening and energy-saving modeling, as well as space-saving modeling, in turn, can be facilitated.

The term "microlens" referred to above means a minute lens having a partial spherical surface at the interface, and pertinent examples thereof include e.g., hemispherical convex lenses, hemispherical concave lenses and the like. The term "diameter (D)" herein means a diameter of the microlens at its base or opening. The term "height (H)" herein means a distance in a vertical direction from the basal plane to the top of the microlens in case of the microlens being a convex lens, and a distance in a vertical direction from the opening to the bottom of the microlens in case of the microlens being a concave lens. The term "distances between the lenses" herein means the shortest distance between a pair of adjacent microlenses. The term "filling rate" herein means a ratio of the area of the microlenses per unit area in the projection shape of the front face. The term "regular triangular lattice pattern" herein means a pattern generated by dividing the front face into regular triangular compartments having the same shape, and arranging the microlenses at each vertex of the regular triangle.

Figure 6:
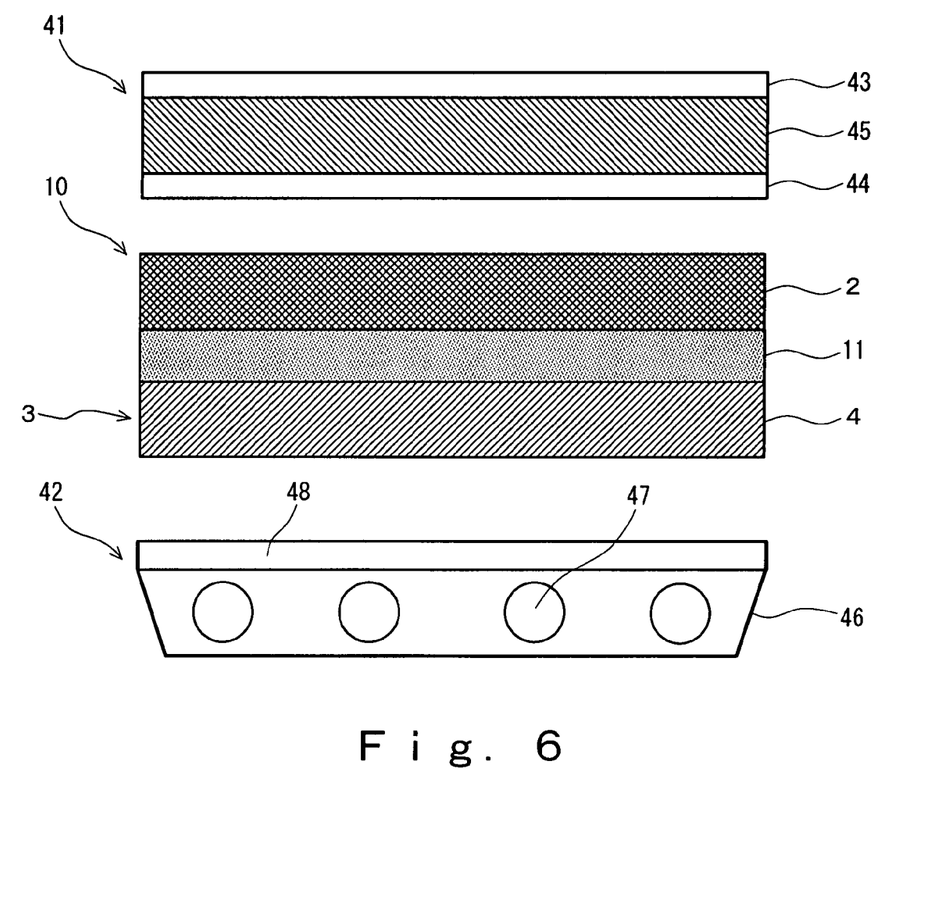
FIG. 6 shows a schematic cross-sectional view illustrating a liquid crystal display module having the optical unit shown in FIG. 3.

Liquid crystal display module shown in FIG. 6 is of the immediate beneath type, and has a liquid crystal display element 41, the optical unit 10 and a backlight 42. The liquid crystal display element 41, the optical unit 10 and the backlight 42 (light-outcoming face) have a substantially the same and rectangular shape in plane, and they are superposed in this order from the front face side to the back face side.

The liquid crystal display element 41 has a front face side-polarizing plate 43 and a back face side-polarizing plate 44 which are disposed in a substantially parallel manner with a certain interval, and a liquid crystal cell 45 sandwiched therebetween. The polarizing plates 43, 44 are not particularly limited, but generally constructed with polarizers such as an iodine-based polarizer, a dye-based polarizer and a polyene-based polarizer, and two pieces of transparent protective films disposed on both sides of the same. The front face side-polarizing plate 43 and the back face side-polarizing plate 44 are constructed such that their transmission axial orientations are orthogonal each other, and that the transmission axial orientation of the back face side-polarizing plate 44 is parallel to the short side orientation (i.e., parallel to the lamp 47).

The liquid crystal cell 45 has a function to control the amount of transmitted light, and a variety of known ones may be employed. The liquid crystal cell 45 has generally a layer structure constructed with a basal plate, a color filter, a counter electrode, a liquid crystal layer, a pixel electrode, and a basal plate. For this pixel electrode, a transparent conductive film such as ITO or the like may be used. As a display mode of the liquid crystal cell 45, for example, TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), HAN (Hybrid Aligned Nematic) or the like proposed hitherto may be used.

The backlight 42 is a surface illuminant apparatus of immediate beneath type, which illuminates the liquid crystal display element 41 from the back face side to permit light emission. As the backlight 42, for example, ones disclosed in JP-A-H11-295731 and the like are known. Specifically, a casing 46, multiple numbers of lamps 47, a diffusion plate 48 and the like are included as major constitutive elements. The casing 46 is formed to give a rectangular tray-like shape (thin box-like shape with the front face side open), and has a reflection layer such as a metal film or the like on the inner face so as to exit the rays of light toward the front face side. The multiple lamps 47 are linear light sources such as cold-cathode tubes, which are disposed in parallel to the short side orientation inside of the casing 46 at substantially regular intervals. The diffusion plate 48 is provided for moderating the lamp image. For example, an opaque white resin plate is generally used which is produced by blending inorganic filler or the like with an acrylic resin, polycarbonate or the like. The backlight 42 having such a structure is constructed so that the rays of light emitted from the lamp 47 exit from the entire face of the front face.

The transmission axial orientation m of the reflection polarizing plate 2 of the optical unit 10 is arranged to be in parallel to the transmission axial orientation of the back face side-polarizing plate 44 of the liquid crystal display element 41. Therefore, the transmission axial orientation m of the reflection polarizing plate 2 is constructed so as to be in parallel to the short side orientation (i.e., parallel to the lamp 47).

In the liquid crystal display module, the polarization components that run along the transmission axial orientation m of the reflection polarizing plate 2 among the rays of light outgoing from the front face of the backlight 42 followed by transmission of the optical sheet 3 (substrate film 4), i.e., rays of light that enter into the reflection polarizing plate 2, will transmit the reflection polarizing plate 2 and the back face side-polarizing plate 44, and then illuminate the liquid crystal cell 45. On the other hand, the polarization components that run along the reflection axial orientation n of the reflection polarizing plate 2 among the rays of light that enter into the reflection polarizing plate 2 are reflected on the reflection polarizing plate 2 toward the back face side, and then reflected on the backlight 42 toward the front face side, whereby they are retroreflected to the reflection polarizing plate 2. In this reciprocal step, owing to the polarizing function of the substrate film 4, effective conversion to the transmission axial orientation m of the reflection polarizing plate 2, i.e., the transmission axial orientation of the back face side-polarizing plate 44, is carried out, and thus the liquid crystal cell 45 is illuminated. As a theoretical action of this polarizing function of the retroreflected rays of light, about 90°-rotation of the polarization orientation of the linear polarization during the reciprocal transmission of the substrate film 4, or the like may be envisaged. Therefore, the liquid crystal display module can markedly enhance the utilization efficiency of the rays of light emitted from the lamp 47, and thus luminance heightening, energy saving, and thin modeling which have been socially demanded these days can be facilitated. In addition, because the liquid crystal display module has an immediate beneath type backlight 42 that exhibits a comparably isotropic polarization characteristic of the outgoing rays of light, the aforementioned polarizing function of the retroreflected rays of light can be effectively performed. Furthermore, since the transparent media layer 11 having the refractive index that is greater than the air is filled to laminate between the reflection polarizing plate 2 and the substrate film 4 in the optical unit 10 of the liquid crystal display module, total reflection critical angle on the front face of the substrate film 4 becomes greater. Consequently, ratio of the rays of light exited from the front face of the optical sheet 3, in turn, utilization efficiency of the rays of light emitted from the lamp 47 can be further enhanced.

The optical unit and the liquid crystal display module of the present invention are not limited to those in the embodiment described above. For example, they are applicable also to liquid crystal display modules in which the back face side-polarizing plate of the liquid crystal display element is substituted for the reflection polarizing plate of the optical unit. The optical unit is also applicable to opposed edge light type liquid crystal display modules, and similar effects to those of the immediate beneath type liquid crystal display module described above can be exerted. The transparent media layer can be also filled to laminate between the reflection polarizing plate 2 and the optical sheet 21 in the optical unit 20 shown in FIG. 4, whereby transmittance of the rays of light can be improved while exhibiting the optical characteristics such as light diffusibility and the like.

Additionally, on the optical unit may be laminated other layer such as an ultraviolet ray absorbing agent layer, a top coat layer and the like. The optical layer of the optical sheet is not limited to the light diffusion layer shown in FIG. 4 or the micro lens array shown in FIG. 5, but may be constructed from, for example, multiple prism parts, cylindrical lens parts and the like arranged in stripes. The microlens constructing the microlens array as shown in FIG. 5 can be also formed into a partial shape of an ellipsoid. According to the microlens having a partial shape of an ellipsoid, optical functions such as a light condensing function to the front side, a diffusing function, a bending function to the normal line orientation can be enhanced, and further, the anisotropy of such optical functions can be achieved.

EXAMPLES

Hereinafter, the present invention will be explained in detail by way of Examples, however, the present invention should not be construed as being limited to the description of these Examples.

Production of Samples of Substrate Film

Samples of rectangular substrate films having a retardation value of 16 nm (sample 1), 70 nm (sample 2), 110 nm (sample 3), 140 nm (sample 4), 170 nm (sample 5) and 320 nm (sample 6), respectively, were produced by sampling at different positions from an original film obtained through biaxially stretching a resin such as polyethylene terephthalate.

Experiment for Determining Relationship Between Angle α of Crystal Orientation and Retardation Value with Face Luminance A liquid crystal display module which has an immediate beneath type backlight, a reflection polarizing plate and a liquid crystal display element in this order from the back face side as shown in FIG. 6, and which exhibits the angle of the transmission axial orientations of the back face side-polarizing plate and the reflection polarizing plate of the liquid crystal display element with respect to the short side orientation being 0° was used. The optical unit was constructed by attaching the substrate film of samples 1 to 6 via a transparent agglutinant on the back face of this reflection polarizing plate, and the face luminance was measured while altering the angle of the crystal orientation of the substrate film with respect to the transmission axial orientation of the reflection polarizing plate in the optical unit. Then, thus obtained face luminance was compared with that obtained without incorporating the substrate film. The results are shown in Table 1 below and the graph in FIG. 7.

TABLE 1

Results of Experiment for Determining Relationship between Angle α of Crystal Orientation and Retardation Value with Face Luminance

| | | Sample 1 | Sample 2 | Sample 3 | Sample 4 | Sample 5 | Sample 6 | |
|---|---|---|---|---|---|---|---|---|
| | | | | Retardation value | | | | |
| | | 16 nm | 70 nm | 110 nm | 140 nm | 170 nm | 320 nm | None |
| Angle | 0 | 2993 | 2990 | 2991 | 2990 | 2990 | 2991 | 3000 |
| of | π/8 | 2995 | 3025 | 3080 | 3113 | 3086 | 3042 | |
| crystal | π/4 | 2997 | 3041 | 3170 | 3230 | 3178 | 3090 | |
| Orientation α | 3π/8 | 2995 | 3025 | 3085 | 3117 | 3092 | 3040 | |
| | π/2 | 2990 | 2990 | 2990 | 2992 | 2990 | 2991 | |
| | 5π/8(−3π/8) | 2991 | 3026 | 3076 | 3114 | 3091 | 3043 | |
| | 3π/4(−π/4) | 2994 | 3040 | 3172 | 3230 | 3180 | 3092 | |
| | 7π/8(−π/8) | 2992 | 3027 | 3069 | 3119 | 3092 | 3045 | |
| | π(0) | 2990 | 2992 | 2990 | 2991 | 2991 | 2992 | |

Unit of crystallographic axial angle α; rad
Unit of luminance value; cd/m²

Evaluation of Relationship Between Retardation Value and Face Luminance

Figure 7:
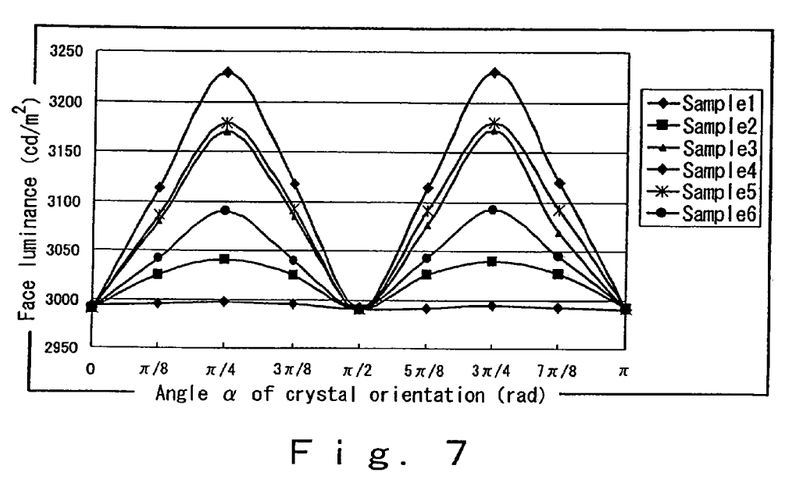
FIG. 7 shows a graph demonstrating a relationship between the crystallographic axial angle α and face luminance.

As shown in Table 1 and the graph in FIG. 7, when the substrate film of any one of the samples 2 to 6 having a retardation value of 70 nm or greater and 320 nm or less, i.e., the substrate film substantially having an optical anisotropy, was pasted on the back face side of the reflection polarizing plate, effect of increasing the face luminance could be achieved as compared with the case in which no sample was incorporated. Particularly, when the substrate film of any one of the samples 3 to 5 having a retardation value of 110 nm or greater and 170 nm or less was pasted on the back face side of the reflection polarizing plate, the effect of increasing the luminance by 5% or more was achieved, which has been accepted as a high added value in market, as compared with the case in which any sample was not present. Moreover, the greatest effect of increasing the luminance could be achieved when the substrate film of the sample 4 having a retardation value of 140 nm was pasted on the back face side of the reflection polarizing plate. From the foregoing results of evaluation with respect to the retardation value, adequacy of the numerical range of the retardation value of the substrate film specified according to the present invention as described above was demonstrated.

Evaluation of Relationship Between Angle α of Crystal Orientation and Face Luminance As shown in Table 1 and the graph in FIG. 7, when the substrate film of any one of the samples 2 to 6 having a retardation value of 70 nm or greater and 320 nm or less was pasted on the back face side of the reflection polarizing plate, effect of increasing the face luminance could be achieved in the case in which the absolute value of the angle α of the crystal orientation of the substrate film with respect to the transmission axial orientation of the reflection polarizing plate was π/8 or greater and 3π/8 or less, as compared with the case in which no substrate film was incorporated. Particularly, when the absolute value of the angle α of the crystal orientation of the substrate film was 3π/16 or greater and 5π/16 or less, the difference in luminance falls within the range of approximately ±1% of the peak luminance. Accordingly, almost equivalent luminance to the peak luminance was obtained, suggesting that variance of the luminance could be lessened. Furthermore, when the absolute value of the angle α of the crystal orientation of the substrate film was π/4, the highest face luminance was developed. In addition, also in the case of the angle α of the crystal orientation of the substrate film having a negative value, similar face luminance to those in the foregoings can be developed. From the aforementioned results of evaluation of the angle α of the crystal orientation, adequacy of the numerical range of the angle α of the crystal orientation specified according to the present invention as described above was demonstrated.

Experiment for Evaluating the Presence of Transparent Media Layer

A liquid crystal display module which has an immediate beneath type backlight, a reflection polarizing plate and a liquid crystal display element in this order from the back face side as shown in FIG. 6, and which exhibits the angle of the transmission axial orientations of the back face side-polarizing plate and the reflection polarizing plate of the liquid crystal display element with respect to the short side orientation being 0° was used. Using the substrate film of the sample 4 having a retardation value of 140 nm, the angle α of the crystal orientation of the substrate film with respect to the transmission axial orientation of the reflection polarizing plate was set to be π/4. Then, face luminance was measured both in the case in which the substrate film was superposed on the back face side of the reflection polarizing plate, and the case in which it was pasted via a transparent agglutinant. The results are shown in Table 2 below.

TABLE 2

Results of Experiment for Evaluating the Presence of Transparent Media Layer

| | Face luminance | Relative value of face luminance |
|---|---|---|
| Case of pasting via agglutinant (with transparent media layer) | 3230 | 100 |
| Case of superposing (without transparent media layer) | 3100 | 95.9 |

Unit of luminance value; cd/m²

Evaluation of the Presence of Transparent Media Layer

As shown in Table 2, higher face luminance was exhibited in the case in which the reflection polarizing plate and the substrate film were pasted via the transparent media layer (agglutinant) as compared with the case in which the reflection polarizing plate and the substrate film were superposed.

INDUSTRIAL APPLICABILITY

As described hereinabove, the optical unit and the liquid crystal display module of the present invention are useful as constitutive elements for liquid crystal display devices, and are particularly suited for use in transmissive liquid crystal display devices.

What is claimed is:

1. A rectangular liquid crystal display module comprising:
a liquid crystal display element in which a liquid crystal cell is sandwiched between a pair of polarizing plates;
an optical unit overlaid on the back face side of the liquid crystal display element; and
a surface illuminant backlight of immediate beneath type or opposed edge light type overlaid on the back face side of the optical unit;
wherein the optical unit is a rectangular layered structural member, comprising:
a reflection polarizing plate that splits reflected beams and transmitted beams on the basis of polarization characteristics;
an optical sheet superposed on a back face side of the reflection polarizing plate; and
a transparent media layer being interposed between the reflection polarizing plate and the optical sheet, said transparent media layer being comprised of a material having a volume which at least substantially fills a space between said back face side of said reflection polarizing plate and a confronting face of said optical sheet;
wherein the optical sheet includes a resin substrate film having an optical anisotropy, the absolute value of the angle of the crystal orientation of the substrate film with respect to the transmission axial orientation of the reflection polarizing plate is $\pi/8$ or greater and $3\pi/8$ or less, and the retardation value of the substrate film is 70 nm or greater and 320 nm or less; and
wherein the reflection polarizing plate of the optical unit is a back face side-polarizing plate of the liquid crystal display element.

* * * * *